May 19, 1942.   F. L. WRIGHT   2,283,839
RUBBER INSULATED BEARING UNIT
Filed June 17, 1939

INVENTOR.
Frank L. Wright
BY C. P. Goepel
his ATTORNEY.

Patented May 19, 1942

2,283,839

UNITED STATES PATENT OFFICE 2,283,839

RUBBER INSULATED BEARING UNIT

Frank L. Wright, Stamford, Conn., assignor to Norma-Hoffmann Bearings Corporation, Stamford, Conn., a corporation of New York Application June 17, 1939, Serial No. 279,598

1 Claim. (Cl. 308—184)

This invention relates to bearing units, and more particularly to the general type in which rubber is used to insulate the bearing unit from the housing in order to absorb vibrations or to provide a resilient material between the outer ring of the bearing and the housing.

The object of this invention is to provide a rubber insulated bearing unit which is a self-contained entity, and in which the bearing unit, which may be either a ball or roller bearing, is formed into an integral part with an outer shell having interposed vulcanized rubber or other and similar resilient material.

The outer shell may be clamped to the housing or may be provided with such a diameter as to provide a frictionally snug fit with the bore of the housing, in which case the outer metallic shell may be ground to size so that it can be readily assembled with the housing by an accurate fit therein.

The improved vibration dampening means is provided by means of a centrally disposed groove in the outer race ring at the outer surface thereof, an outer thin metallic embracing shell having inwardly shaped outer ends and not extending beyond the plane passing through the lateral sides of the outer race ring, and a layer of yieldable or resilient material disposed between the outer surface of the outer race ring and the inner surface and the ends of the outer metallic embracing shell, whereby the interposed yieldable and resilient material takes up vibrations and dampens the same, the relationship of the inner shaped ends and the groove of the outer race ring being such as to prevent a shearing action between the interposed yieldable and resilient material and said inner shaped ends and groove, the resilient material being preferably of vulcanized rubber.

The entire unit, constituted as described, is supplied to the user ready to be applied to a shaft and inserted within the bore of the housing.

With these objects, and with the invention as defined, the invention will be further described hereinafter, an embodiment thereof shown in the drawing, and the invention will be finally pointed out in the claim.

In the accompanying drawing.

Similar characters of reference indicate corresponding parts throughout the various views.

Figure 2:
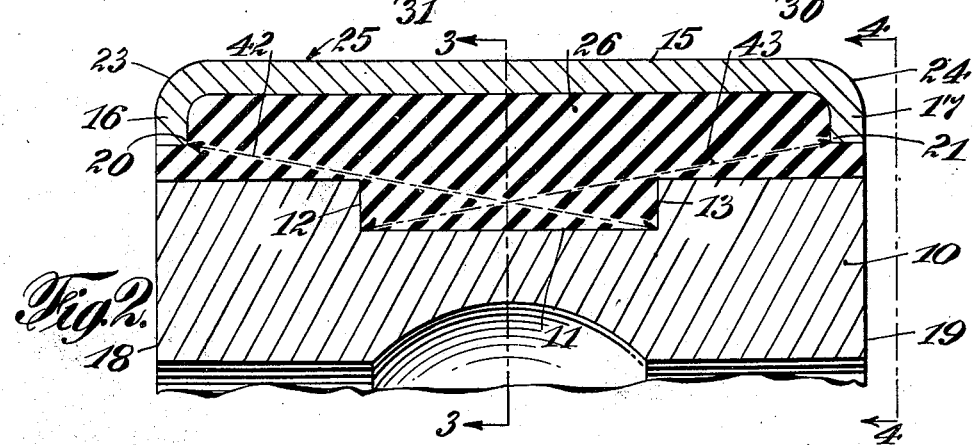
Figure 2 is a vertical, radial section of the outer race ring, formed into a self-contained unit with the outer embracing shell and the interposed resilient medium.
Figures 3, 4:
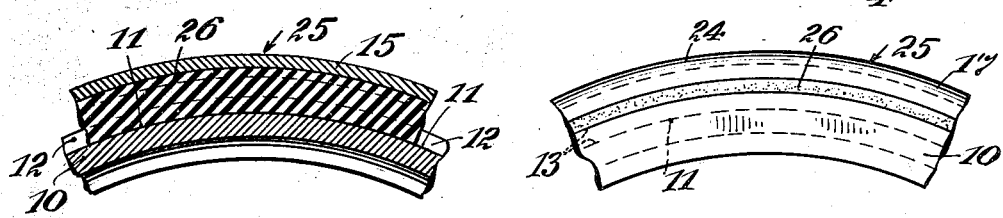
Figure 3 is a radial section taken on line 3—3 of Figure 2 in smaller scale.
Figure 4 on same scale as Figure 3, is an end view as seen from line 4—4 of Figure 2.

Referring to the drawing, and more particularly to Figure 2, the outer race ring 10 is provided with a centrally disposed groove 11 formed by shoulders 12 and 13. The groove 11 extends circumferentially around the outer race ring and is of uniform depth throughout its circumferential disposition. There is provided an outer shell 15 having a length shorter than the width of the outer race ring, but having extending portions which are bent at substantially a right angle as indicated by the ends 16 and 17. The outer surfaces of the ends 16 and 17 are in the planes 18 and 19 passing through the outer edges 16 and 17 of the shell 15, and the end portions 16 and 17 are provided with corners 20 and 21 directed inwardly of these planes 18 and 19. Finally, at the juncture of the portion 15 and its ends 16 and 17 the shell 15 has curved portions 23 and 24, this being a preferable form to provide a pleasing appearance. This outer shell could be made up of three parts suitably joined together, namely, the part 15 and the end parts 16 and 17; and the outer corners 23 and 24 could be square-shaped instead of curved or rounded. The outer shell, indicated in general by 25, is spaced a suitable distance from the outermost surface of the outer ring 10, and between the inner surface of the shell 25 and the outer surfaces of the outer race ring 10, a layer of Latex or Duprene fluid is inserted by first pouring the same into the space between the outer shell and the outer race ring, and then heating it to the necessary temperature for a suitable length of time until vulcanized in position. When this operation has been completed, the shell 25, the interposed layer 26, and the outer race ring 10 form an integral member, and when so formed the outer race ring 10, as part of this integral member, may be assembled with an inner race ring 27, ball or roller B, and cage 29 in the usual manner so as to form a self-contained rubber insulated bearing unit, and as such the entire unit may be supplied by the manufacturer to the user.

The outer metallic shell is either first properly ground to the desired size so that it can be accurately fitted into the bore of the housing prior to the shell being made a part of this integral member, or the outermost surface of the shell 25 may be ground at the place where it is to be inserted into the bore of the housing; or, if desired, the rubber insulated bearing unit as described may be clamped in the housing. The shell 25 may be made of pressed steel, left soft as pressed to shape. Or, it may be thereafter carburized and hardened. Or, for certain applications, it could be made of brass, aluminum or other material. Instead of the vulcanized Latex or Duprene fluid, any other rubber or similar resilient material suitably vulcanized may be used as interposed between the outer ring and the outer embracing shell.

Figure 1:
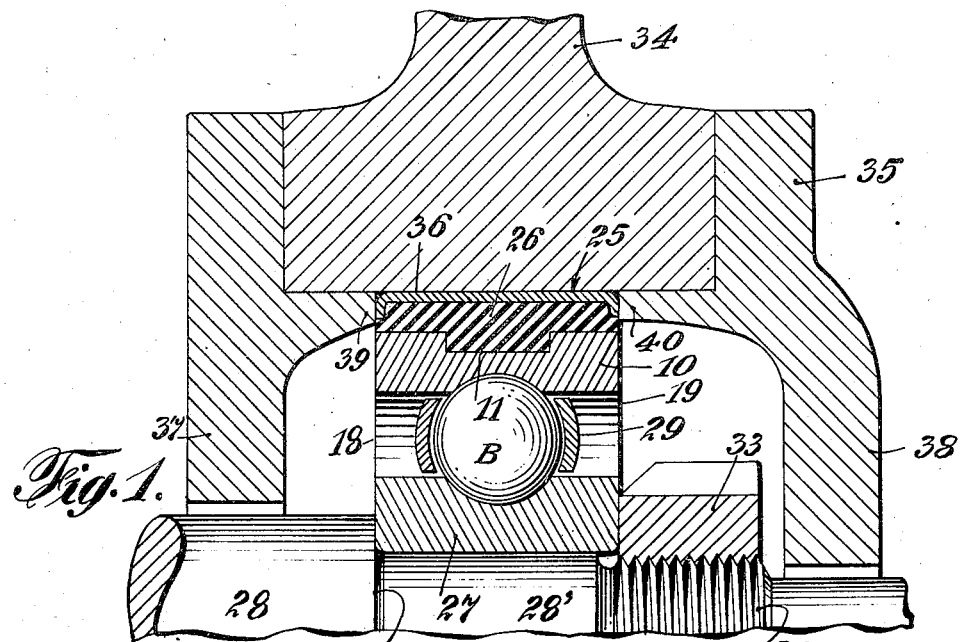
Figure 1 is a vertical, central longitudinal section of a shaft and a housing with the improved rubber insulated bearing unit disposed between the shaft and the housing.

After the rubber insulated bearing unit has been completed in the form shown in Figure 1, it may then be assembled as in Figure 1 to a subcaliber shaft 28 at its subcaliber portion 28'. In the embodiment shown, this shaft is provided with a screw-threaded portion 30, and when the rubber insulated bearing unit is placed upon the subcaliber portion 28' against the shoulder 31, it is held in position on the shaft against longitudinal movement by the inner race ring 27 abutting at one side against the shoulder 31, and at the other side against the nut 33 having an interior screw thread engaging the screw thread 30 of the shaft 28.

The housing 34 has a bore 36 against which the shell portion 25 of the rubber insulated bearing unit fits, and the housing 35 has downwardly extending flange members 37 and 38 which have their innermost cheek portions 39 and 40 embrace and abut against the shell 25 so as to hold it in position.

The general assembly of Fig. 1 is shown for the purpose of illustrating the application of the rubber insulated bearing unit to a shaft and a housing, but no claim is made specifically thereto, the invention being the arrangement and co-relationship of the integral unit as described. In this integral unit it is important to consider that due to the inward groove 11 of the outer race ring 10 which is filled with the vulcanized material, the shoulders 12 and 13 act as resisting abutments against resultant lines of force caused by any lateral or longitudinal movement of the shell 25 acting upon the interposed vulcanized rubber. There are shown in dot and dash lines two double headed arrows, one 42, and one 43. These are indicative of the resultants of forces. For instance, should a pressure be exerted upon the outer shell 25 from left to right of the bearing shown in Figure 2, the arrow 42 will indicate the resistance offered against any shearing action which might otherwise result and act upon the interposed layer of rubber. Should a force be exerted from the right hand toward the left hand of Figure 2 upon the shell 25, the arrow 43 indicates the resultant of force actions resisting movement of the shell in respect to the outer race ring 10, and this again prevents any shearing action of the rubber layer.

By virtue of the structure described, a self-contained unit has been provided which is secure against any shearing action, and at the same time provides a means for dampening the vibrations and reducing the noise of ball or roller bearings.

It has been found as the result of extensive study and experimentation that the best constructions now known to applicant include the provision of a complete bearing unit comprising an inner race ring, an outer race ring, a ring of rolling elements interposed between said race-rings, a mounting ring element circumjacent to said outer race ring, and a ring of elastic vibration absorbing material interposed between said outer race ring element and said circumjacent mounting ring element, said outer race ring having a circumferential groove filled by said elastic material, and said mounting ring element being formed with side flanges extending radially inward toward the periphery of said outer race ring, said flanges being spaced from said groove and defining generally the lateral boundaries of said ring of elastic material.

It has also been found desirable, in a unit constructed as above to form the mounting ring element as an integral ring of sheet metal channel-shaped in cross-section and of a thickness suitable to permit said mounting ring to be machined peripherally, the lateral margins of the elastic cushion being extended between the in-turned edges of the mounting ring flanges and the underlying margins of the outer race ring, to complete the vibration-absorbing insulation therebetween.

It has been found further that if the vibration-absorbing, anti-friction unit of the present invention be fabricated by the herein disclosed method which comprises the steps of assembling the ring elements, introducing the cushioning material in a flowable or plastic state, and vulcanizing said material in place between said concentric ring elements to form a permanent, elastic cushioning ring, the said cushioning ring element will exist in the unit in a substantially tension-free uncompressed state when not under load, and will therefore constitute a very sensitive cushioning element with a very wide range of compressibility.

I have described an embodiment of my invention, but it will be clear that changes may be made within the principle of the invention described, without departing from the scope of the subjoined claim.

I claim:

In a rubber insulated bearing unit, the combination of an outer race ring of a ball bearing having a centrally located rectangular groove in its outer surface having shoulders, an outer thin, metallic embracing shell adapted to have its exterior fixedly seated in a housing and having inwardly shaped outer ends with their exterior sides extending substantially in the planes passing through the lateral sides of the outer race ring enclosing a rectangular shaped space, the free ends of the sides of the shell being spaced from the outer race ring, and a layer of yieldable vulcanized material disposed within said groove and between the outer surface of the outer race ring and the inner surface and within the ends of the outer metallic embracing shell, the depth of the material entering the groove between the shoulders and the depth of the material entering the shell between the outer ends thereof being each greater than the thickness of the material between the outer race ring and said ends, the groove being of less width than the space between said ends whereby the interposed yieldable material takes up vibrations and the relationship of the inner rectangularly shaped ends of the shell and the groove in the outer race ring is such as to confine any horizontal shearing action upon the interposed yieldable material to that narrow portion disposed between the outer race ring and the ends of the shell.

FRANK L. WRIGHT.